(12) United States Patent
Ohmura

(10) Patent No.: US 10,363,928 B2
(45) Date of Patent: *Jul. 30, 2019

(54) VEHICLE CONTROL SYSTEM

(71) Applicant: MAZDA MOTOR CORPORATION, Hiroshima (JP)

(72) Inventor: Hiroshi Ohmura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 63 days.

This patent is subject to a terminal disclaimer.

(21) Appl. No.: 15/515,063

(22) PCT Filed: Aug. 29, 2016

(86) PCT No.: PCT/JP2016/075233
§ 371 (c)(1),
(2) Date: Mar. 28, 2017

(87) PCT Pub. No.: WO2018/042498
PCT Pub. Date: Mar. 8, 2018

(65) Prior Publication Data
US 2018/0370526 A1 Dec. 27, 2018

(51) Int. Cl.
*B60W 30/09* (2012.01)
*G06K 9/00* (2006.01)
(Continued)

(52) U.S. Cl.
CPC ........ *B60W 30/09* (2013.01); *B60W 30/0953* (2013.01); *B60W 30/0956* (2013.01);
(Continued)

(58) Field of Classification Search
USPC ........................................... 701/301
See application file for complete search history.

(56) References Cited

U.S. PATENT DOCUMENTS 6,044,321 A * 3/2000 Nakamura ......... B60K 31/0008
180/179
6,324,462 B1 * 11/2001 Kageyama ........... G05D 1/0223
180/167
(Continued)

FOREIGN PATENT DOCUMENTS

EP    2 648 172 A1    10/2013
JP    2011-051547 A    3/2011
(Continued)

OTHER PUBLICATIONS

International Search Report issued in PCT/JP2016/075233; dated Oct. 11, 2016.
(Continued)

*Primary Examiner* — Tyler D Paige
(74) *Attorney, Agent, or Firm* — Studebaker & Brackett PC

(57) ABSTRACT

ECU 10 is configured to: detect an object (a parked vehicle 3, a pedestrian 6, a traffic signal 7) external to the vehicle 1; determine a speed distribution area 40 extending at least in a lateral area of the object in the travelling direction and defining a distribution of an allowable upper limit of the relative speed of the vehicle 1 with respect to the object in a travelling direction; calculate the relative speed with respect to the object in the travelling direction; and execute an avoidance control (S14) for restricting the relative speed so that the relative speed does not exceed the allowable upper limit. The speed distribution area 40 is determined such that the allowable upper limit is made lower as a lateral distance from the object becomes smaller.

11 Claims, 8 Drawing Sheets

(51) Int. Cl.
*B60W 30/095* (2012.01)
*B60W 30/14* (2006.01)

(52) U.S. Cl.
CPC ....... *B60W 30/146* (2013.01); *G06K 9/00805* (2013.01); *G06K 9/00825* (2013.01)

(56) References Cited

U.S. PATENT DOCUMENTS

| | | | | |
|---|---|---|---|---|
| 8,514,100 | B2* | 8/2013 | Yamashita | G08G 1/166 340/4.1 |
| 9,132,775 | B2 | 9/2015 | Ohama et al. | |
| 9,505,412 | B2* | 11/2016 | Bai | G08B 21/06 |
| 9,711,049 | B2* | 7/2017 | Baba | G08G 1/166 |
| 9,893,699 | B2* | 2/2018 | Zollner | G08G 1/167 |
| 2002/0152015 | A1* | 10/2002 | Seto | B60K 31/0008 701/96 |
| 2003/0139883 | A1* | 7/2003 | Takafuji | B60R 21/0132 701/301 |
| 2006/0064219 | A1* | 3/2006 | Murakami | B60R 21/0136 701/45 |
| 2011/0199199 | A1* | 8/2011 | Perkins | B60Q 1/506 340/435 |
| 2011/0246156 | A1* | 10/2011 | Zecha | G08G 1/166 703/6 |
| 2011/0288774 | A1* | 11/2011 | Bengtsson | G08G 1/16 701/301 |
| 2014/0236386 | A1* | 8/2014 | Yoshizawa | B60W 30/08 701/1 |
| 2014/0316666 | A1* | 10/2014 | Bordes | B60T 7/12 701/70 |
| 2015/0210279 | A1 | 7/2015 | Agnew et al. | |
| 2017/0043771 | A1* | 2/2017 | Ibanez-Guzman | B60W 30/0956 |
| 2017/0287332 | A1* | 10/2017 | Ranninger Hernandez | G08G 1/005 |
| 2017/0327094 | A1* | 11/2017 | Inoue | B60T 7/22 |
| 2018/0056997 | A1* | 3/2018 | Ohmura | B60W 10/20 |
| 2018/0065627 | A1* | 3/2018 | Ohmura | B60W 30/09 |
| 2018/0178745 | A1* | 6/2018 | Foltin | B60R 21/0134 |

FOREIGN PATENT DOCUMENTS

| | | |
|---|---|---|
| JP | 2015-155295 A | 8/2015 |
| WO | 2016/024318 A1 | 2/2016 |

OTHER PUBLICATIONS

Written Opinion issued in PCT/JP2016/075233; dated Oct. 11, 2016.

The extended European search report issued by the European Patent Office dated Apr. 1, 2019, which corresponds to European Patent Application No. 16915059.6-1012 and is related to U.S. Appl. No. 15/515,063.

* cited by examiner

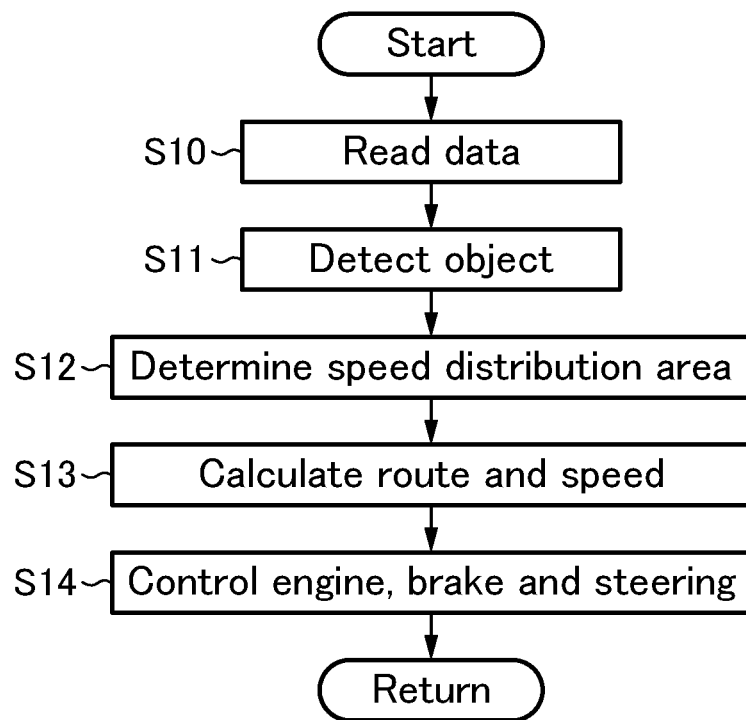

VEHICLE CONTROL SYSTEM

TECHNICAL FIELD

The present invention relates to a vehicle control system, and more particularly to a vehicle control system for assisting a safe travelling of a vehicle.

BACKGROUND ART

Conventionally, a motor vehicle has a plurality of safe driving assist systems which are mounted thereon and include a lane keeping assist system and/or an automated cruise system. In such systems, an automatic brake control and/or a steering assist control or the like are used respectively. Therefore, respective ones of a brake request signal for performing the automatic brake control, and a steering request signal for performing the steering assist control may be issued from respective ones of the systems. For example, the brake request signal may be issued from different systems at different timings. In such case, one of the request signals in the plurality of request signals may be prioritized over the others in the plurality of request signals (for example, refer to Patent Document 1).

CITATION LIST

Patent Document

Patent Document 1: Japanese Laid-Open Patent Publication: JP2011-051547A

SUMMARY OF INVENTION

Technical Problem

However, since there is a high possibility that the safe driving assist system may become more complicated in the future, there may be a risk in such a complicated system that the safe driving assist system may not function efficiently as a whole only by giving priority to one of such request signals.

The present invention has been made to solve the above problem, and an object thereof is to provide a vehicle control system which can efficiently perform a vehicle control for safe driving assistance.

Solution to the Technical Problem

In order to achieve the above object, the present invention provides a vehicle control system mounted on a vehicle, the system being configured for carrying out a control for detecting an object external to the vehicle, determining a speed distribution area extending at least in a lateral area of the object in the travelling direction of the vehicle and defining a distribution of an allowable upper limit of a relative speed of the vehicle with respect to the object in a travelling direction of the vehicle, and executing an avoidance control for restricting the relative speed of the vehicle with respect to the object so that the relative speed does not exceed the allowable upper limit in the speed distribution area.

In the vehicle control system in accordance with the present invention having the above features, the speed distribution area is determined at least in the lateral area of the detected object. In this speed distribution area, the allowable upper limit of the relative speed when the vehicle passes the object is determined. In addition, according to the present invention, the relative speed of the vehicle with respect to the object is controlled so that it does not exceed the allowable upper limit which is determined for this speed distribution area. As such, the present invention is configured to limit the allowable upper limit for the relative speed between the object and the vehicle, and allows for integrally controlling the safe driving assist system such as the automatic brake control and the steering assist control, so that it is possible to provide the safe driving assistance through a simple and efficient speed control.

In the vehicle control system of the present invention, preferably, the speed distribution area is set or determined such that the allowable upper limit is made lower as a lateral distance from the object becomes smaller.

In the vehicle control system in accordance with the present invention having the above features, the control is such that the allowable upper limit for the relative speed of the vehicle is limited according to the distance from the object, and when the vehicle passes the object in a condition where the vehicle is far from the object, a large relative speed is allowed, but when the vehicle passes the object in a condition where the vehicle and the object are close to each other, the vehicle speed is limited to make the relative speed lower.

In the vehicle control system of the present invention, preferably, in the avoidance control, a speed and/or a steering direction of the vehicle is changed to have the relative speed of the vehicle in the speed distribution area restricted from exceeding the allowable upper limit.

In the vehicle control system in accordance with the present invention having the above features, in order to restrict the relative speed of the vehicle from exceeding the allowable upper limit which is determined in the speed distribution area, the system may be configured to change (decelerate) the speed itself of the vehicle, or may alternatively be configured to change the travelling path of the vehicle by changing the steering direction so that the vehicle is passed an area with a larger allowable upper limit, or may even be configured to change both of the speed and the steering direction.

In the vehicle control system of the present invention, preferably, in the avoidance control, a route of the vehicle is calculated based on the speed distribution area.

In the vehicle control system in accordance with the present invention having the above features, it is possible for the vehicle to travel on a safe route with respect to the object.

In the vehicle control system of the present invention, it is preferable that the speed distribution area is defined also for a region extending from a lateral area to a rearward area of the object such that the allowable upper limit is made lower as the lateral distance and a longitudinal distance from the object become smaller.

In the vehicle control system in accordance with the present invention having the above features, the aforementioned control rule is made to be applied even to the case where the vehicle passes the preceding vehicle from a situation where the vehicle is travelling rearward portion of the preceding vehicle or rearward and lateral portion of the preceding vehicle, so that the allowable upper limit of the relative speed is determined even to such a case. Thus, according to the present invention, it is possible to maintain a safe relative speed and allow for a simple and efficient control also when the vehicle is travelling rearward portion or rearward and lateral portion of the preceding vehicle.

In a preferable aspect of the vehicle control system of the present invention, the speed distribution area is determined also for a region from a lateral area to a forward area of the object such that the allowable upper limit is made lower as the lateral distance and the longitudinal distance from the object become smaller.

In the vehicle control system in accordance with the present invention having the above features, the aforementioned control rule is made to be applied even to the case where the vehicle has passed the preceding vehicle but the vehicle still goes further ahead from the object, that is, the passed vehicle, so that the allowable upper limit of the relative speed is determined even to such a case. Thus, according to the present invention, it is possible to maintain a safe relative speed and allow for a simple and efficient control also when the vehicle has passed the preceding vehicle.

In the vehicle control system of the present invention, preferably, the speed distribution area is determined such that the allowable upper limit is zero in a region apart from the object by a predetermined safe distance.

In the vehicle control system in accordance with the present invention having the above features, the vehicle can only approach the object up to a region apart from the object by the safe distance. Thus, according to the present invention, even if the object suddenly moved in a direction approaching the vehicle, it is possible to prevent the vehicle and the object from contacting with each other.

In the vehicle control system of the present invention, preferably, the safe distance is changed depending on types of the detected object and/or an absolute speed of the vehicle.

In the vehicle control system in accordance with the present invention having the above features, the safe distance between the object and the vehicle is determined depending on what the object is, and how fast the vehicle is travelling. Thus, it is possible to provide a larger sense of security and improve safety for the driver depending on the situation.

In the vehicle control system of the present invention, preferably, the rate of change of the allowable upper limit with respect to the distance from the object is determined depending on types of the detected object.

In the vehicle control system in accordance with the present invention having the above features, the size of the speed distribution area is determined depending on types of the object. Thus, it is possible to determine the speed distribution area which has a breadth appropriate for the object. Specifically, the rate of change can be made smaller in a case where the object is a pedestrian than in a case where the object is a vehicle.

In addition, in the vehicle control system of the present invention, specifically, the object includes at least one of a vehicle, a pedestrian, a bicycle, a travelling path partition, an obstacle, a traffic signal, a traffic sign.

Meritorious Effect of Invention

According to the present invention it is possible to provide the vehicle control system which can efficiently perform the vehicle control for the safe driving assistance.

BRIEF DESCRIPTION OF DRAWINGS

FIG. 8 is a process flow of a vehicle control system according to one embodiment of the present invention.

DESCRIPTION OF EMBODIMENTS

Figure 1:
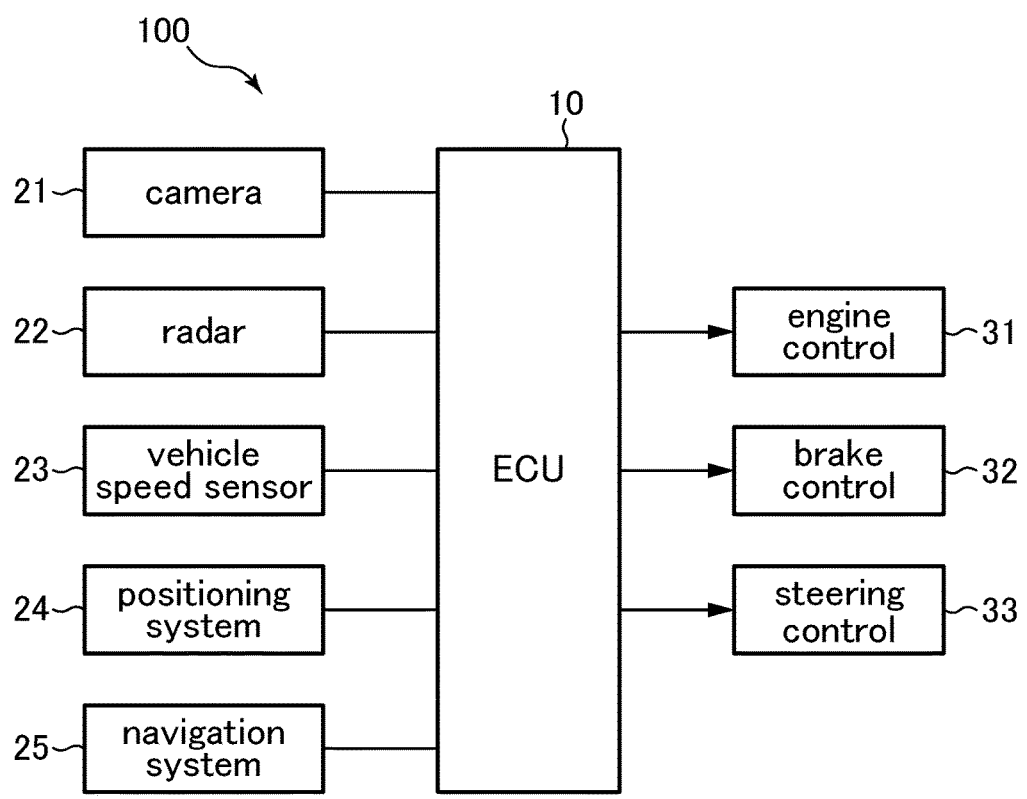
FIG. 1 is a block diagram of a vehicle control system according to one embodiment of the present invention.

With reference to the accompanying drawings, a vehicle control system according to one embodiment of the present invention will now be described. First, with reference to FIG. 1, the configuration of the vehicle control system will be described. FIG. 1 is a block diagram of the vehicle control system.

As depicted in FIG. 1, an engine control system 100 is mounted on a vehicle 1 (refer to FIG. 2), and comprises a vehicle control system (ECU) 10, a plurality of sensors, and a plurality of control systems. The plurality of sensors includes a car-mounted camera 21, a millimeter-wave radar 22, a vehicle speed sensor 23, a positioning system 24 and a navigation system 25. In addition, the plurality of control systems include an engine control system, a brake control system 32 and a steering control system 33.

The ECU 10 is configured by a computer comprising a CPU, a memory for storing various kinds of programs, and an input/output device or the like. The ECU 10 is configured to allow for, based on the signals received from the plurality of sensors, outputting respective ones of request signals to the engine control system 31, the brake control system 32 and the steering control system 33 for appropriately activating respective ones of engine system, a brake system and a steering system. Thus, the ECU 10 can be described as functionally comprising a data acquisition part, an object detection part, a position and relative speed calculation part, a speed distribution area determining part, a route calculation part and an avoidance control executing part.

The car-mounted camera 21 takes images around the vehicle 1 and outputs the taken image data. The ECU 10 specifies an object (for example, a preceding vehicle) based on the image data. Further, the ECU 10 can specify a travelling direction or a forward-rearward direction of the object from the image data.

The millimeter-wave radar 22 is a measurement device for measuring the position and speed of the object, which transmits an electric wave (transmission wave) toward a forward area of the vehicle 1 and receives a reflection wave which is produced as a result of the transmission wave being reflected at the object. Then, the millimeter-wave radar 22 measures the distance between the vehicle 1 and the object (for example, the inter-vehicle distance) and/or a relative speed of the object with respect to the vehicle 1 based on the transmission wave and a reception wave. Further, according to the present embodiment, it is possible to substitute the millimeter-wave radar 22 by a laser radar, an ultrasonic sensor or the like for measuring the distance and/or the relative speed with respect to the object. In addition, it is possible to configure a position and speed measurement device using the plurality of sensors.

The vehicle speed sensor 23 functions to calculate an absolute speed of the vehicle 1.

The positioning system 24 comprises a GPS system and/or a gyro system, which functions to calculate the position of the vehicle 1 (current vehicle position information).

The navigation system 25 has map information stored therein, and can provide the map information to the ECU 10. The ECU 10 specifies roads, traffic signals, structural objects or the like existing around the vehicle 1 (particularly, a forward area as seen in the travelling direction) based on the map information and the current vehicle position information. In addition, the ECU 10 may specify a scarp, a trench, a hole or the like based on the map information, which are difficult to be specified from the image data by the car-mounted camera 21.

The map information may be stored in the ECU 10.

The engine control system 31 constitutes a controller for controlling an engine of the vehicle 1. The ECU 10 outputs an engine output change request signal to the engine control system 31 for requesting a change in the engine output when the vehicle 1 needs to be accelerated or decelerated.

The brake control system 32 constitutes a controller for controlling a braking device of the vehicle 1. The ECU 10 outputs a brake request signal to the brake control system 32 for requesting a braking force to be applied to the vehicle 1 when the vehicle 1 needs to be decelerated.

The steering control system 33 constitutes a controller for controlling a steering device of the vehicle 1. The ECU 10 outputs a steering direction change request signal to the steering control system 33 for requesting a change in the steering direction when the travelling direction of the vehicle 1 needs to be changed.

Figure 2:
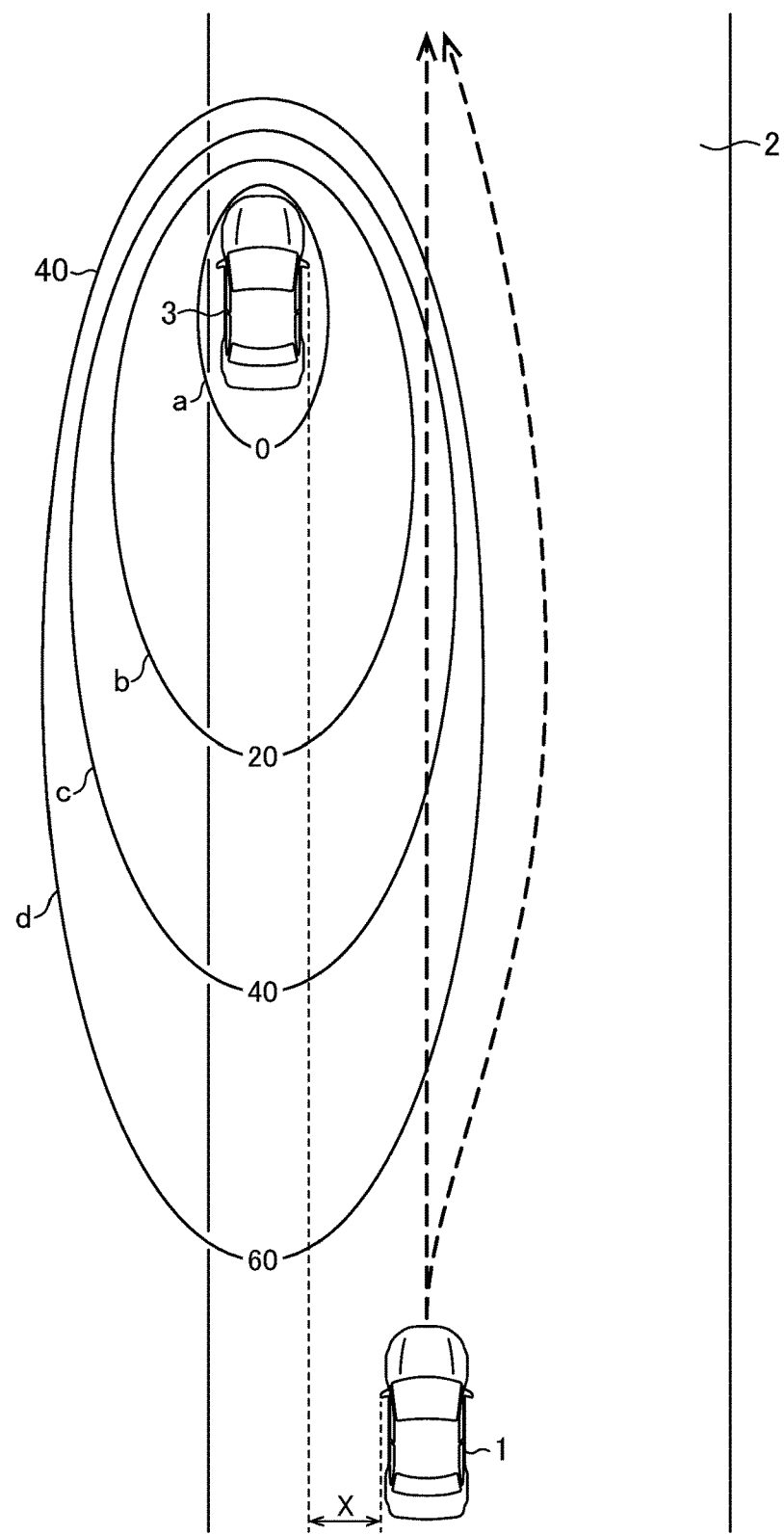
FIG. 2 is an explanatory diagram describing a passing speed control according to one embodiment of the present invention.
Figure 3:
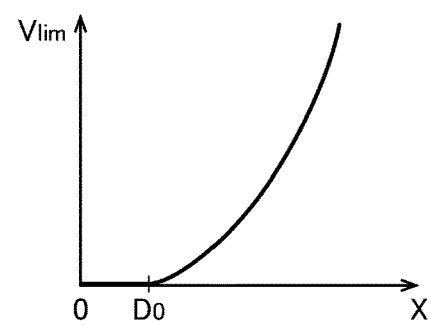
FIG. 3 is an explanatory diagram depicting a relationship between an allowable upper limit of passing speed and a clearance in a lateral direction with respect to an object according to one embodiment of the present invention.

Subsequently, based on FIGS. 2 and 3, description will be made on a passing speed control function according to the present embodiment. FIG. 2 is an explanatory diagram describing the passing speed control, and FIG. 3 is an explanatory diagram depicting a relationship between an allowable upper limit of passing speed and a clearance in a lateral direction with respect to an object.

In FIG. 2, there is shown a situation wherein the vehicle 1 is travelling on a travelling lane 2, and is travelling a side of another vehicle 3 which is being parked at a side of the travelling lane 2 so that the vehicle 1 passes the vehicle 3.

Generally, when passing (or overtaking) an object (for example, a preceding vehicle, a parked vehicle, a guardrail) on or near a road, a driver of the travelling vehicle keeps a predetermined clearance or space (a lateral distance) between the travelling vehicle and the object in a lateral direction perpendicular to the travelling direction, and decelerates to a speed where the driver of the travelling vehicle feels safe. Specifically, in order to avoid dangers such as a case where the preceding vehicle suddenly changes a path, where a pedestrian comes out from a blind spot of the object, and/or where a door of the parked vehicle opens, the relative speed with respect to the object is made lower as the clearance becomes smaller.

In addition, generally, when the travelling vehicle 1 is approaching the preceding vehicle from behind, the driver of the travelling vehicle adjusts the speed (relative speed) depending on the distance between the two vehicles (longitudinal distance) along the travelling direction. Specifically, as long as the distance between the two vehicles is large, an approaching speed (relative speed) is maintained high, but when the distance between the vehicles becomes small, the approaching speed is made low. Further, the relative speed between both vehicles becomes zero at a predetermined inter-vehicle distance. This is similarly applied to a case where the preceding vehicle is a parked vehicle.

As described above, the driver drives the vehicle considering the relationship of the distance between the object and the vehicle (including the lateral distance and longitudinal distance), and the relative speed so as to avoid dangers.

Thus, in accordance with the present embodiment, as depicted in FIG. 2, the vehicle 1 is provided with a system which is configured such that a two-dimensional distribution area (speed distribution area 40) is determined around the object (over a lateral area, a rearward area, and a forward area) for defining allowable upper limits for the relative speeds in the travelling direction of the vehicle 1 with respect to the object (for example, the parked vehicle 3) detected from the vehicle 1. In the speed distribution area 40, at respective points around the object, an allowable upper limit $V_{lim}$ of the relative speed is determined respectively. The vehicle 1 is restricted in the relative speed with respect to the object within the allowable upper limit $V_{lim}$ in the speed distribution area 40 when the driving assistance system is activated.

As can be seen from FIG. 2, the speed distribution area 40 is determined such that the allowable upper limit of the relative speed is made lower as the lateral distance and the longitudinal distance from the object become smaller (as the vehicle 1 approaches the object). In addition, in FIG. 2, for ease of comprehension, there are shown iso-relative speed lines which are drawn by connecting points of the same allowable upper limit. Respective ones of the iso-relative speed lines a, b, c and d corresponds to respective ones of the allowable upper limits $V_{lim}$ of 0 km/h, 20 km/h, 40 km/h and 60 km/h.

Further, the speed distribution area 40 may not necessarily be determined all over around the object, and may be determined on at least one side of the object in the lateral direction where the vehicle 1 exists (the right side area of the vehicle 3 in FIG. 2). In addition, in FIG. 2, the speed distribution area 40 is depicted also in the area where the vehicle 1 does not travel (outside of the travelling lane 2), but the speed distribution area 40 may be determined only on the travelling lane 2. Further, in FIG. 2, the speed distribution area 40 of the allowable upper limit up to 60 km/h is depicted, but the speed distribution area 40 may be determined up to a larger relative speed considering a case where the vehicle 1 passes an oncoming vehicle travelling in the opposite direction on the oncoming lane.

As depicted in FIG. 3, when the vehicle 1 travels at a certain absolute speed, the allowable upper limit $V_m$, determined in the lateral direction of the object is 0 (zero) km/h under a clearance X below $D_0$ (a safe distance), and increases as the clearance X is increased beyond a value $D_0$ along a quadratic function curve ($V_{lim}=k(X-D_0)^2$ Provided $X \geq D_0$). Specifically, for ensuring safety, the relative speed of the vehicle 1 is set to zero when the clearance X is less than $D_0$. By contrast, when the clearance is larger than $D_0$, the vehicle 1 may be allowed to pass the object with a larger relative speed as the clearance becomes larger.

In the example of FIG. 3, the allowable upper limit in the lateral direction of the object is defined by $V_{lim}=f(X)=k(X-D_0)^2$. Here, the character k represents a gain factor related to a rate of change in $V_m$ with respect to X, which is determined depending on types or the like of the object. Also, $D_0$ is determined depending on types or the like of the object.

Further, in the present embodiment, $V_{lim}$ is defined as including the safe distance and to be a quadratic function of X, but the present invention is not limited thereto, and $V_{lim}$ may not include the safe distance and may be defined by another function (for example, a linear function or the like). In addition, with reference to FIG. 3, the allowable upper limit $V_{lim}$ in the lateral direction of the object has been described, but it is possible to determine the allowable upper limit $V_{lim}$ for all of radial directions including the longitudinal direction of the object. In such case, the factor k and the safe distance $D_0$ may be determined according to the directions from the vehicle to the object.

Figure 5:
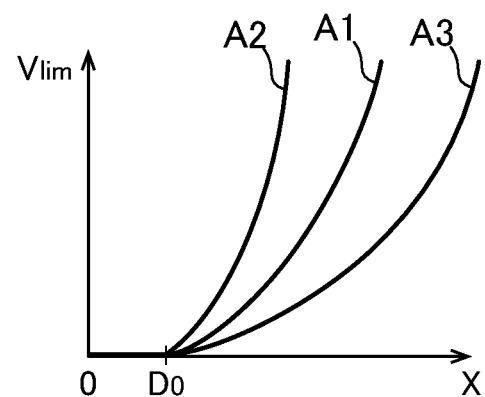
FIG. 5 is an explanatory diagram depicting a relationship between an allowable upper limit of passing speed and a clearance, the relationship being shown for several different types of objects according to one embodiment of the present invention.
Figure 6:
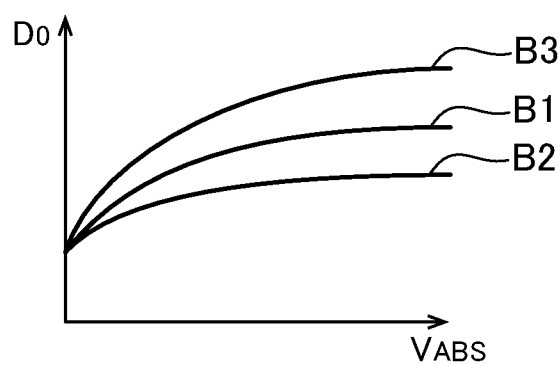
FIG. 6 is an explanatory diagram of a safe distance according to different types of objects and vehicle absolute speed according to one embodiment of the present invention.

Subsequently, with reference to FIGS. 4A, 4B, 4C, 5 and 6, other examples of the speed distribution areas will be described. Respective ones of FIGS. 4A, 4B and 4C show explanatory diagrams of the speed distribution areas in cases where the object is a guardrail or the like, a pedestrian and a traffic signal, FIG. 5 shows an explanatory diagram depicting a relationship between the allowable upper limit of passing speed and the clearance, the relationship being shown for several different types of objects, and FIG. 6 shows an explanatory diagram of the safe distance according to different types of objects and the vehicle absolute speed.

Figure 4A:
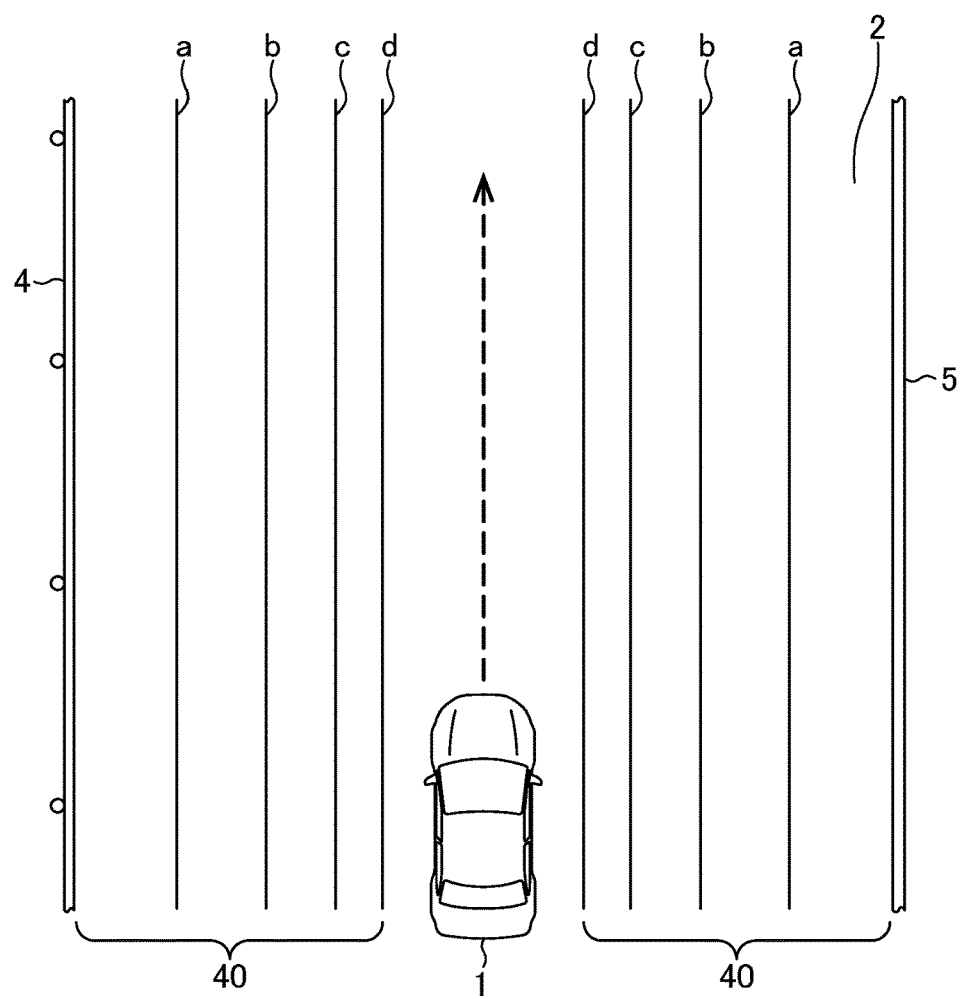
FIG. 4A is an explanatory diagram of a speed distribution area determined with respect to a guardrail or the like according to one embodiment of the present invention.

FIG. 4A depicts a case where a guardrail 4 and a lane border line 5 are provided along the travelling lane 2. It may be considered that these objects extend in a longitudinal direction along the travelling lane 2, and are comprised only of a side surface (lateral surface), or of small objects being sequentially positioned in the longitudinal direction. Thus, in the speed distribution area 40 determined with respect to such objects, iso-relative speed lines a to d are determined also to extend along the travelling lane 2. Therefore, the vehicle 1 is allowed to travel at a high speed along a center of the travelling lane 2, but its speed is limited to a lower speed as an end of the travelling lane 2 is approached.

Figure 4B:
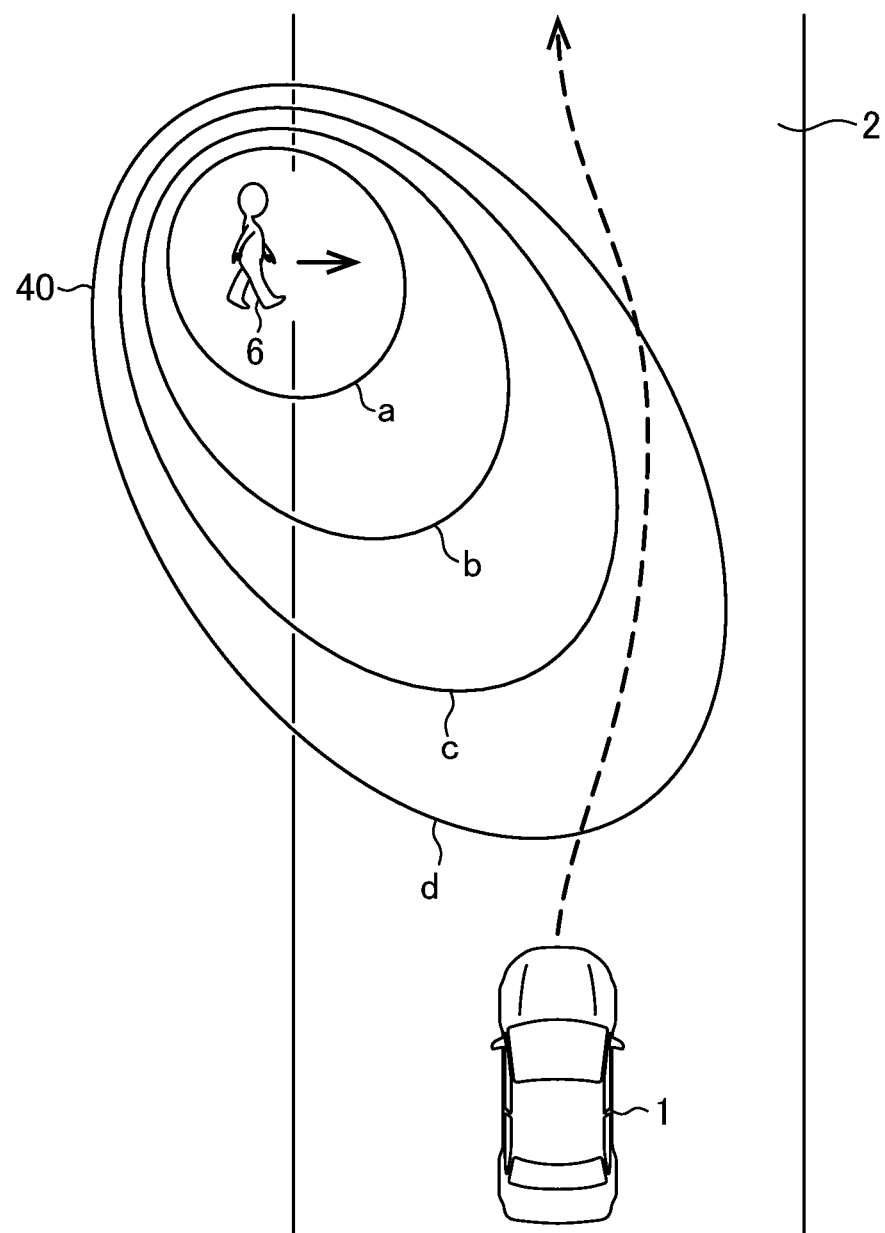
FIG. 4B is an explanatory diagram of a speed distribution area determined with respect to a pedestrian according to one embodiment of the present invention.
Figure 4C:
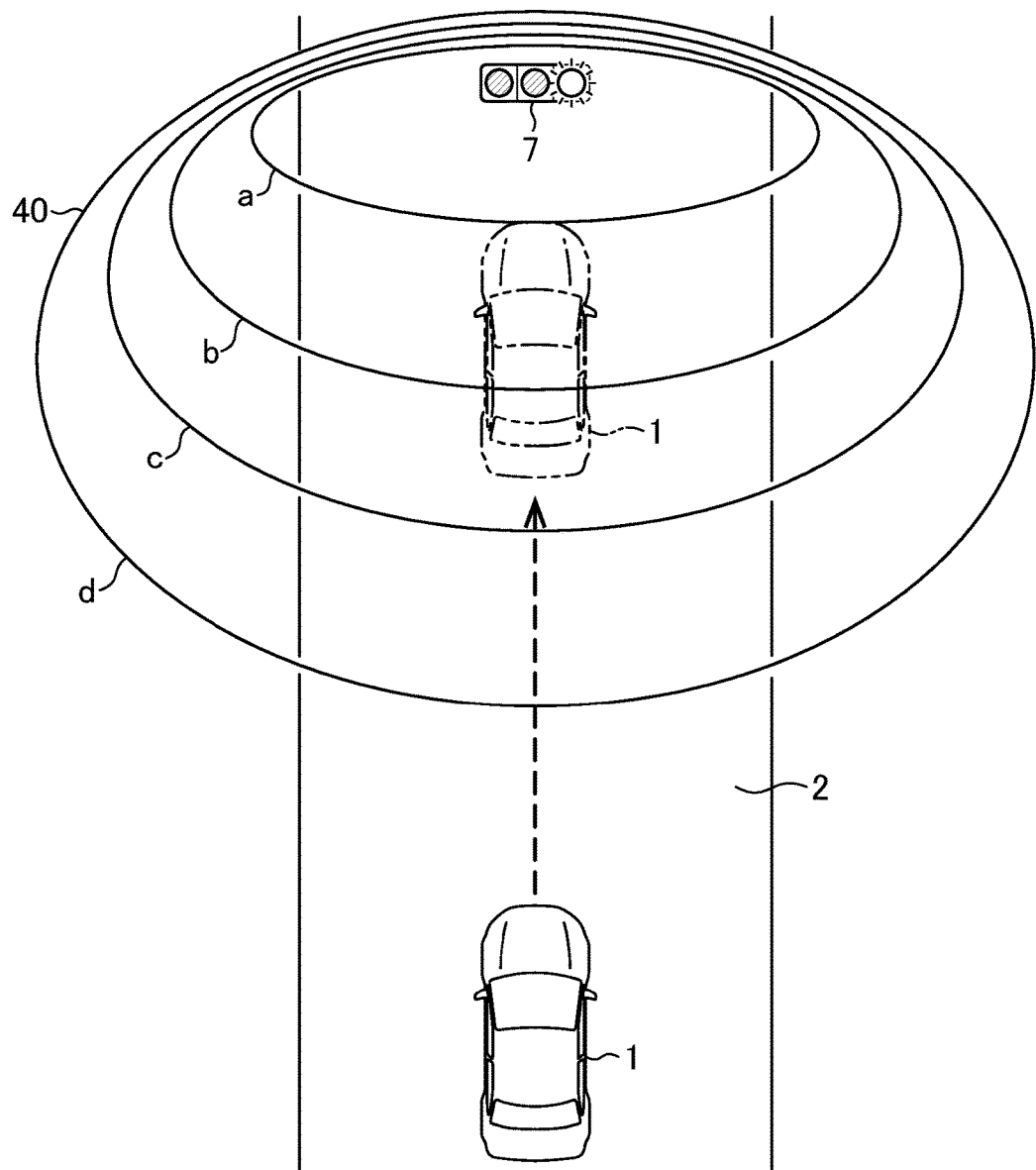
FIG. 4C is an explanatory diagram of a speed distribution area determined with respect to a traffic signal according to one embodiment of the present invention.

Further, FIG. 4B depicts a case where a pedestrian 6 on the travelling lane 2, or a pedestrian 6 on an external walking path near the travelling lane 2 is going to cross the travelling lane 2. It should be noted that in the case shown in FIG. 2, the object (the parked vehicle 3) does not have a velocity component perpendicular to the travelling direction of the vehicle 1. Thus, the speed distribution area 40 depicted in FIG. 2 is formed such that the iso-relative speed line of near elliptical shape extends toward the vehicle along the travelling direction of the vehicle 1.

However, as in FIG. 4B, when the object (pedestrian 6) has a velocity component in the lateral direction perpendicular to the travelling direction of the vehicle 1 or when it is predicted that the object will have a velocity component in the lateral direction, the speed distribution area 40 is defined to extend toward the vehicle 1 along the travelling direction of the vehicle 1 and to extend also in the lateral direction (rightward in FIG. 4B) along the travelling direction of the object. In FIG. 4B, it may be predicted from the image data by the car-mounted camera 21 that the pedestrian 6 is moving rightward, for example.

Still further, FIG. 4C depicts a case where a traffic signal 7 in front of the vehicle 1 on the travelling lane 2 is "red".

In this case, the iso-relative speed lines a to d are defined in this order from the traffic signal 7 toward the vehicle 1. Thus, the vehicle 1 may gradually decelerate in the speed distribution area 40, and stop at the position of the iso-relative speed line a (0 km/h).

FIG. 5 is a graph similar to that shown in FIG. 3, but examples of the guardrail (line A2) and the pedestrian (line A3) are added in addition to the example of the vehicle (line A1). In the case of the guardrail (line A2), the rate of change in the allowable upper limit $V_{lim}$ with respect to the clearance X is determined larger than that in the case of the vehicle (line A1). In the case of the guardrail, the danger is easier to be predicted than that in the case of the vehicle, so that a larger rate of change (factor k) can be determined.

In addition, in the case of the pedestrian (line A3), the rate of change (factor k) in the allowable upper limit $V_m$ with respect to the clearance X is determined smaller than that in the case of the vehicle (line A1). It is thereby possible to further improve safety for the pedestrian. In addition, different gains (factor k) may be determined for respective ones of a case where the pedestrian is an adult, a case where the pedestrian is a child, and a case where there are a plurality of pedestrians.

It should further be noted that different values of the safe distance $D_0$ may be adopted for different types of the objects. For example, the safe distance may be determined such that it becomes smaller in the order of the pedestrian, the vehicle, the guardrail. Further, the safe distance may be larger for the child than that for the adult.

FIG. 6 depicts respective ones of relationships between a vehicle speed $V_{ABS}$ (absolute speed) and the safe distance $D_0$, in the case where the object is the vehicle (line B1), the case where the object is the guardrail (line B2), and the case where the object is the pedestrian (line B3). As depicted in FIG. 6, the safe distance $D_0$ is determined larger as the absolute speed of the vehicle 1 gets larger. Therefore, the safe distance is determined larger when the vehicle 1 overtakes the preceding vehicle at a high speed than when the vehicle overtakes the preceding vehicle at a low speed.

Thus, the speed distribution area may be determined based on various parameters. As the parameters, for example, the relative speed of the vehicle 1 and the object, the type of the object, the travelling direction of the vehicle 1, the travelling direction and the moving speed of the object, length of the object, the absolute speed of the vehicle 1 or the like may be considered. Specifically, the factor k and the safety distance $D_0$ may be selected based on these parameters.

It should further be noted that, in the present embodiment, the object can include a vehicle, a pedestrian, a bicycle, a travelling path partition, an obstacle, a traffic signal, a traffic sign or the like. Further, the vehicle may be differentiated by an automobile, a truck, and a motor bicycle. The pedestrian may be categorized to an adult, a child and a group. The travelling path partition may include a guiderail, a shoulder forming a step at a transverse end of the travelling path, a center median, and a lane border line. The obstacle may include a scarp, a trench, a hole and a fallen object. The traffic sign may include a halt line and a halt sign.

It should be noted that, in FIGS. 2 and 4, the speed distribution area is depicted independently for respective ones of the objects, but when a plurality of objects exist closely, a plurality of speed distribution areas may overlap with each other. Thus, in such an overlapping part, the iso-relative speed line may be determined by giving a priority to the line having a smaller allowable upper limit and excluding the others, or smoothly connecting the two near elliptical shapes, instead of the iso-relative speed line of the near elliptical shape as depicted in FIGS. 2 and 4.

Figure 7:
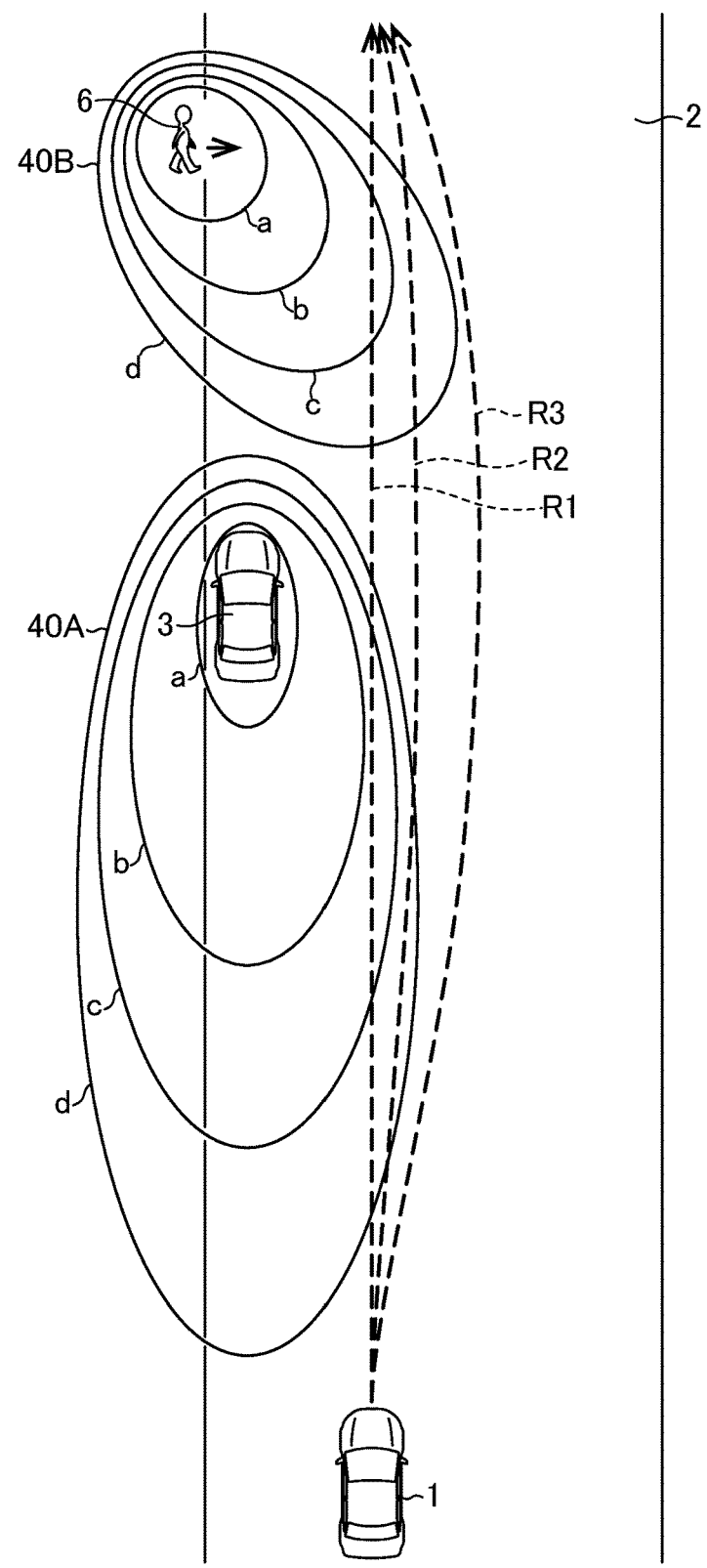
FIG. 7 is an explanatory diagram of an operation of a vehicle control system according to one embodiment of the present invention.

Subsequently, with reference to FIGS. 7 and 8, description will be made on a process flow of the vehicle control system according to the present embodiment. FIG. 7 shows an explanatory diagram of the operation of the vehicle control system, and FIG. 8 is a process flow of the vehicle control system.

As depicted in FIG. 7, when the vehicle 1 is travelling on the travelling lane, the ECU 10 (data acquisition part) of the vehicle 1 acquires various data from a plurality of sensors (S10). Specifically, the ECU 10 receives image data from the car-mounted camera 21, the image data representing an image of the front area of the vehicle 2 taken by the car-mounted camera 21, receives measurement data from the millimeter-wave radar 22, and receives vehicle speed data from the vehicle speed sensor 23.

The ECU 10 (object detection part) detects the object by processing the data acquired from exterior sensors including at least the car-mounted camera 21 (S11). Specifically, the ECU 10 detects the parked vehicle 3 and the pedestrian 6 as the objects by executing an image processing of the image data.

At this time, the type of the objects (in this case, a vehicle, a pedestrian) is specified. In addition, the ECU 10 can detect the presence of a specific obstacle from the map information.

Further, the ECU 10 (position and relative speed calculation part) calculates the position and the relative speed of the detected objects (the parked vehicle 3 and/or the pedestrian 6) with respect to the vehicle 1 based on the measurement data. Further, the position of the object includes a y direction position (longitudinal distance) along the travelling direction of the vehicle 1, and an x direction position (lateral distance) along the lateral direction orthogonal to the travelling direction. For the relative speed, the relative speed included in the measurement data may be used directly, or a velocity component along the travelling direction may be calculated from the measurement data. In addition, the velocity component perpendicular to the travelling direction may not necessarily be calculated, but may be estimated from the plurality of measurement data and/or the plurality of image data, if necessary.

The ECU 10 (speed distribution area determining part) further functions to determine speed distribution areas 40A and 40B for all of the detected objects (specifically, the parked vehicle 3 and the pedestrian 6), respectively (S12). In addition, the ECU 10 (route calculation part) calculates the route where the vehicle 1 may be able to travel, as well as a specified vehicle speed or a target speed at respective positions on the route, according to a predetermined mode, based on all of the determined speed distribution areas 40A, 40B (S13).

Further, at respective points on the route, the specified vehicle speed is calculated such that the relative speed with respect to the object has a value of the allowable upper limit $V_{lim}$ which is smaller among the allowable upper limits of the plurality of the speed distribution areas, and adjusted such that a change in speed along the route will become smooth. Then, in order for the vehicle 1 to travel on the calculated route, the ECU 10 (avoidance control executing part) executes an avoidance control as in the followings according to the predetermined mode (S14).

Further, the vehicle 1 is configured such that the driver can select a desired drive assist mode using an input device not shown. Further, a predetermined mode may be set in the ECU 10 in advance. In addition, the process flow of FIG. 8 is repeatedly executed at every predetermined time (for example, 0.1 second), so that the calculated route and the specified speed on the route changes with time.

Now, referring to FIG. 7, description will be made on a case where the calculated routes are the routes R1, R2 and R3.

The route R1 is a straight travelling route. The route R1 is calculated when a straight travelling prioritized mode (or a shortest distance prioritized mode) is selected. The route R1 crosses the iso-relative speed lines d, c, c, d of the speed distribution area 40 A, and the iso-relative speed lines d, c, c, d of the speed distribution area 40 B respectively. Therefore, when the vehicle 1 travels on the route R1, the allowable upper limit of the relative speed in the travelling direction is changed on the route R1. Specifically, the allowable upper limit is once made lower and then made higher (the speed distribution area 40A), and made lower and then made higher again (the speed distribution area 40B).

In addition to the straight travelling prioritized mode, when selection is made on an automatic speed follow-up mode for having the vehicle automatically follow the specified speed (for example, the specified speed of 60 km/h), while travelling on the route R1, the vehicle 1 may be automatically decelerated as the vehicle 1 approaches the parked vehicle 3, after passing the parked vehicle 3, accelerated up to the specified speed, and then decelerated as the vehicle 1 approaches the pedestrian 6, and after passing the pedestrian 6, accelerated up to the specified speed again. In order to execute such avoidance control, the ECU 10 outputs respective ones of the engine output change request signal and the brake request signal to respective ones of the engine control system 31 and the brake control system 32 so that it is restricted not to exceed the allowable upper limit by following the allowable upper limit (a relative speed component along the travelling direction) at a speed lower than the specified vehicle speed on the route R1.

Further, when the automatic speed follow-up mode is not additionally selected, if the vehicle 1 enters the route R1 at a relative speed of 60 km/h, even if the driver maintains the same depressed or actuated position of the accelerator, the speed of the vehicle 1 is automatically controlled under the action of the avoidance control. Specifically, unless the driver decreases the depressed or actuated amount of the accelerator to decelerate the vehicle to the relative speed less than the allowable upper limit, the relative speed of the vehicle 1 is maintained at the allowable upper limit at respective points. In this condition, when the vehicle 1 enters the route R1 for example at the relative speed of 40 km/h, the relative speed is maintained at 40 km/h (not accelerated or decelerated) until the vehicle enters the iso-relative speed line c (corresponding to 40 km/h) if the accelerator depressed or actuated amount is not decreased.

On the other hand, the route R3 is a route which passes outside the iso-relative speed line d of the speed distribution areas 40A and 40B. The route R3 is calculated when a speed prioritized mode is selected, the mode being the one which is designed to suppress a vehicle speed reduction.

In addition to the vehicle speed prioritized mode, when an automatic steering mode for automatically controlling a steering direction of the vehicle 1 is selected, since the allowable upper limit on the route R3 is at least larger than the relative speed of 60 km/h, if the vehicle 1 enters the route R3 at the speed of 60 km/h (absolute speed), unless there is no change in speed of the vehicle 3 and the pedestrian 6, the vehicle 1 travels on the route R3 under the automatic steering control with the same vehicle speed being maintained. In order to execute such avoidance control, the ECU 10 outputs the steering direction change request signal to the steering control system 33 so that the vehicle 1 travels on the route R3. However, at this time, the vehicle speed according to the depressed or actuated amount of the accelerator is maintained, so that the engine output change request signal and/or the brake request signal are not produced.

Further, the route R3 is a route calculated when the relative speed of the vehicle 1 is 60 km/h, so that it is defined as a route to pass along the outside the iso-relative speed line d (corresponding to 60 km/h) of the speed distribution areas 40A and 40B. However, when the relative speed of the vehicle 1 is 40 km/h, for example, another route is calculated to pass along the outside of the iso-relative speed line c (corresponding to 40 km/h) of the speed distribution areas 40A and 40B.

Further, when the automatic steering mode is not additionally selected, if the vehicle 1 travelling at 60 km/h has its path changed by the driver's operation of the steering wheel to enter the route R3, the vehicle 1 is not subjected to the limitation of the relative speed by the speed distribution areas 40A and 40B unless there is no change in the speed of the vehicle 3 and the pedestrian 6. Therefore, in travelling on the route R3, the ECU 10 does not output an engine output change request signal and/or a brake request signal, so that the vehicle speed according to the depressed or actuated position of the accelerator is maintained.

Further, the route R2 is a route which passes between the route R1 and the route R3. The route 2 is calculated when a combined mode where the straight travelling prioritized mode and the speed prioritized mode are combined (specifically, a driver selective mode where the driver determines the proportion of priority between both modes) is selected.

In addition to the combined mode, when the automatic steering mode is selected, the vehicle 1, travelling at vehicle speed according to the depressed or actuated amount of the accelerator (for example, 60 km/h), travels on the route R2 at the relative speed limited by the allowable upper limit at respective points on the route R2, with the vehicle speed at that time being adopted as the upper limit. In order to execute such avoidance control, the ECU 10 executes a speed control by the engine output change request signal and the brake request signal so that the relative speed of the allowable upper limit is followed at respective positions on the route R2, and also executes a steering control by the steering direction change request signal for the vehicle 1 to travel the route R2.

It should further be noted that when the automatic steering mode is not additionally selected, the vehicle 1, travelling at the vehicle speed according to the depressed or actuated amount of the accelerator (for example, 60 km/h), may have its path changed by the drivers operation of the steering wheel to enter the route R2. In this case, the vehicle 1 travels on the route R2 at the relative speed limited by the allowable upper limit at respective points on the route R2, with the vehicle speed according to the depressed or actuated amount of the accelerator being adopted as the upper limit. In order to execute such avoidance control, the ECU 10 outputs an engine output change request signal and a brake request signal for executing the speed control similar to what is described above.

When straight travelling is prioritized, a change in speed is large, so that the driver is subjected to a larger acceleration in forward or rearward direction (a longitudinal G). On the other hand, when speed is prioritized, a steering angle becomes larger with the speed being maintained, so that the driver is subjected to a larger lateral acceleration (a lateral G). Thus, for example, it is possible to determine a plurality of stages for the combined mode, adopting a proportion of the longitudinal G and the lateral G as an evaluation function for comfort. Therefore, at each of the stages of the combined mode, a route is calculated where the proportion of the longitudinal G and the lateral G is within a predetermined range.

Further, as depicted in FIG. 4C, when the object is a traffic signal 7 (traffic signal light is red), in step S13, the ECU 10 (the route calculation part) calculates a route for the vehicle to stop at the iso-relative speed line a (corresponding to 0 km/h). Then, the ECU 10 outputs the engine output change request signal and the brake request signal so that the relative speed of the allowable upper limit on the route is followed. The vehicle 1 thereby decelerates as the red traffic signal is approached, and finally stops before the red traffic signal.

Subsequently, the operation of the vehicle control system (ECU) 10 in accordance with the present embodiment will be described.

According to the present embodiment, the speed distribution area 40 is determined at least in the lateral area of the detected object (the parked vehicle 3, the pedestrian 6 or the like). In this speed distribution area 40, the allowable upper limit of the relative speed when the vehicle 1 passes the object is determined. In addition, according to the present embodiment, the relative speed of the vehicle 1 with respect to the object is controlled so that it does not exceed the allowable upper limit which is determined for the speed distribution area 40. As such, the present embodiment is configured to limit the allowable upper limit for the relative speed between the object and the vehicle 1, and allows for integrally controlling the safe driving assist system such as the automatic brake control and the steering assist control, so that it is possible to provide the safe driving assistance with a simple and efficient speed control.

In the present embodiment, the speed distribution area 40 is set or determined such that the allowable upper limit is made lower as the lateral distance and the longitudinal distance from the object become smaller. Thus, according to the present embodiment, the control is such that the allowable upper limit for the relative speed of the vehicle 1 is limited according to the distance from the object, and when the vehicle 1 passes the object in a condition where the vehicle is far from the object, a large relative speed is allowed, but when the vehicle 1 passes the object in a condition where the vehicle and the object are close to each other, the vehicle speed is limited to make the relative speed lower.

According to the present embodiment, in the avoidance control (S14), the speed and/or the steering direction of the vehicle 1 is changed to have the relative speed of the vehicle 1 in the speed distribution area 40 restricted from exceeding the allowable upper limit. In carrying out this avoidance control, control may be made to change (decelerate) the speed itself of the vehicle 1 as in the case of the route R1 in FIG. 7, or to change the travelling path of the vehicle by changing the steering direction so that the vehicle is passed an area with a larger allowable upper limit as in the case of the route R3, or even to change both of the speed and the steering direction as in the case of the route R2.

According to the present embodiment, in order to execute the avoidance control, the route of the vehicle 1 is calculated based on the speed distribution area 40, so that it is possible for the vehicle 1 to travel on a safe route with respect to the object.

According to the present embodiment, the speed distribution area 40 is defined also for a region extending from a lateral area to a rearward area of the object such that the allowable upper limit is made lower as a lateral distance and a longitudinal distance from the object become smaller. Thus, according to the present embodiment, the aforementioned control rule is made to be applied even to the case where the vehicle 1 passes the preceding vehicle from a situation where the vehicle 1 is travelling rearward portion of the object or rearward and lateral portion of the object, so that the allowable upper limit of the relative speed can be determined even to such a case. Therefore, according to the present embodiment, it is possible to maintain a safe relative speed and allow for a simple and efficient control also when the vehicle 1 is travelling rearward portion or rearward and lateral portion of the preceding vehicle.

According to the present embodiment, the speed distribution area 40 is defined also for a region from a lateral area to a forward area of the object such that the allowable upper limit is made lower as a lateral distance and a longitudinal distance from the object become smaller. Thus, in the present embodiment, the aforementioned control rule is made to be applied even to the case where the vehicle 1 has passed the preceding vehicle but the vehicle 1 still goes further ahead from the object, so that the allowable upper limit of the relative speed can be determined even to such a case. Therefore, according to the present embodiment, it is possible to maintain a safe relative speed and allow for a simple and efficient control also when the vehicle has passed the preceding vehicle.

According to the present embodiment, as depicted in FIG. 3, the speed distribution area 40 is determined such that the allowable upper limit is zero in a region apart from the object by a predetermined safe distance $D_0$. Thus, according to the present embodiment, the vehicle 1 can only approach up to a region apart from the object by the safe distance $D_0$. Therefore, according to the present embodiment, even if the object suddenly moved in a direction approaching the vehicle 1, it is possible to prevent the vehicle 1 and the object from contacting with each other.

According to the present embodiment, the safe distance $D_0$ is, as depicted in FIG. 6, determined depending on types of the detected object and/or an absolute speed of the vehicle 1. Thus, according to the present embodiment, the safe distance $D_0$ between the object and the vehicle 1 is determined depending on what the object is, and how fast the vehicle 1 is travelling. Therefore, according to the present embodiment, it is possible to provide a larger sense of security and improve safety for the driver depending on the situation.

According to the present embodiment, as depicted in FIG. 5, the rate of change of the allowable upper limit with respect to the distance from the object is determined depending on types of the detected object. Thus, according to the present embodiment, the size of the speed distribution area 40 is determined depending on types of the object. Therefore, according to the present embodiment, it is possible to determine the speed distribution area 40 which has a size appropriate for the object.

LIST OF REFERENCE SIGNS 1, 3: vehicle
2: travelling lane
4: guardrail
5: lane border line
6: pedestrian
7: traffic signal
21: car-mounted camera
22: millimeter-wave radar
23: vehicle speed sensor
24: positioning system
25: navigation system
31: engine control system
32: brake control system
33: steering control system
40, 40A, 40B: speed distribution area
100: vehicle control system
a, b, c, d: iso-relative speed line
$D_0$: safe distance
X: clearance
R1, R2, R3: route

The invention claimed is:

1. A vehicle control system mounted on a vehicle, the system being configured to;
   detect an object external to the vehicle,
   determine a speed distribution area extending at least in a lateral area of the object in a travelling direction of the vehicle and defining a distribution of an allowable upper limit of a relative speed of the vehicle with respect to the object in the travelling direction of the vehicle, and
   execute an avoidance control for restricting the relative speed of the vehicle with respect to the object so that the relative speed does not exceed the allowable upper limit in the speed distribution area.

2. The vehicle control system as recited in claim 1, wherein the speed distribution area is determined such that the allowable upper limit is made lower as a lateral distance from the object becomes smaller.

3. The vehicle control system as recited in claim 1, wherein, in the avoidance control, the speed and/or the steering direction of the vehicle is changed to have the relative speed of the vehicle in the speed distribution area restricted from exceeding the allowable upper limit.

4. The vehicle control system as recited in claim 1, wherein, in the avoidance control, a route of the vehicle is calculated based on the speed distribution area.

5. The vehicle control system as recited in claim 1, wherein the speed distribution area is defined also for a region extending from the lateral area to a rearward area of the object such that the allowable upper limit is made lower as a lateral distance and a longitudinal distance from the object become smaller.

6. The vehicle control system as recited in claim 1, wherein the speed distribution area is defined also for a region extending from the lateral area to a forward area of the object such that the allowable upper limit is made lower as a lateral distance and a longitudinal distance from the object become smaller.

7. The vehicle control system as recited in claim 1, wherein the speed distribution area is determined such that the allowable upper limit is zero in a region apart from the object by a predetermined safe distance.

8. The vehicle control system as recited in claim 7, wherein the safe distance is changed depending on types of the detected object and/or an absolute speed of the vehicle.

9. The vehicle control system as recited in claim 1, wherein a rate of change of the allowable upper limit with respect to a distance from the object is changed depending on types of the detected object.

10. The vehicle control system as recited in claim 9, wherein the rate of change in a case where the object is a pedestrian is smaller than that in a case where the object is a vehicle.

11. The vehicle control system as recited in claim 1, wherein the object includes at least one of a vehicle, a pedestrian, a bicycle, a travelling path partition, an obstacle, a traffic signal, and a traffic sign.

* * * * *